United States Patent Office 3,192,256
Patented June 29, 1965

3,192,256
PROCESS FOR MAKING PERACIDS BY THE OXIDATION OF ALDEHYDES
Alexander F. MacLean and Adin L. Stautzenberger, Corpus Christi, Tex., assignors to Celanese Corporation of America, New York, N.Y., a corporation of Delaware
No Drawing. Filed Feb. 4, 1960, Ser. No. 6,636
9 Claims. (Cl. 260—502)

This application is a continuation-in-part of our co-pending application Serial No. 676,423, filed August 5, 1957 now abandoned.

This invention relates to the production of peracetic acid.

The production of peracetic acid by reaction of oxygen and acetaldehyde in the vapor phase is known, as in J. E. Bludworth U.S. Patent No. 2,314,385. However, the yields of peracetic acid are not as high as desired, and much of the acetaldehyde which has been reacted is obtained in the form of acetic acid, rather than in the form of the desired peracetic acid.

It is an object of this invention to provide a new and improved process for the oxidation of acetaldehyde in the vapor phase to produce peracetic acid in better yields and with less formation of acetic acid.

Other objects of this invention will be apparent from the following detailed description and claims. In this description and claims all proportions are by weight unless otherwise specified.

In accordance with one aspect of this invention the vapor phase reaction of oxygen and acetaldehyde to form peracetic acid is carried out in a reactor the surfaces of whose walls are substantially inert in the reaction. We have found that by the use of a reactor having such walls, peracetic acid is produced efficiently in excellent yields with only a minor amount of the acetaldehyde being oxidized to acetic acid, and the ratio of peracetic acid to acetic acid in the products is very high. Outstanding results are obtained when the reactor walls are made of aluminum; in this case the actual surface of the walls is most likely aluminum oxide.

The oxygen may be supplied to the reaction zone in substantially pure form, or in admixture with an inert diluent, e.g. as air.

The reaction may be carried out conveniently by feeding the acetaldehyde and oxygen to the reactor which is maintained at an elevated temperature, for example, a temperature in the range of about 80 to 200° C.; best results are obtained at temperatures up to about 180° C., preferably about 140–180° C. No preheating of the reactants is necessary, but the reaction is promoted by backmixing, in the reactor, of the products of reaction with the fresh feed. Presumably, such back-mixing supplies the free radicals (by peracetic acid decomposition) which we believe initiate the reaction, so that no induction period for the formation of such radicals in the fresh feed is needed. The proportion of oxygen in the feed mixture of oxygen and acetaldehyde should be kept relatively low so that at no stage of the process is there present a mixture which is explosive under the prevailing conditions. Thus, when using a reactor in which there is some turbulence and feeding substantially pure oxygen and acetaldehyde, a safe proportion of oxygen in the feed mixture is about 12 mole percent or less. However, by the use of a mechanically stirred reactor, insuring substantially complete back-mixing, as described in co-pending application Ser. No. 722,200 filed March 18, 1958 it is possible to employ much higher proportions of oxygen in the feed mixture, e.g. 25 mole percent and above. It is desirable to have at least 5 mole percent of oxygen, and preferably higher, in the feed mixture.

The time of contact of the oxygen and acetaldehyde at the reaction temperature may be relatively long. The optimum time depends on the reaction temperature. Generally, the optimum time is in the range of about 5 to 30 seconds, when operating at atmospheric pressure. At higher pressures, the reaction rate increases and the optimum time of contact will be less. The highest mole ratios of peracetic acid to acetic acid are obtained when the oxygen is not completely reacted; it is preferred to use conditions in which the maximum conversion of oxygen is about 95%.

For best results, it is preferable that in the reactor the surface: volume ratio be relatively low, e.g. below about 1 cm.$^{-1}$.

While best results have been attained in aluminum reactors, other reactors may be employed. Thus, we found that a glass reactor surfaced with a film of low molecular weight polyethylene (Polyethylene No. 6A produced by Allied Chemical and Dye Corporation) gave good results at temperatures below the melting point of the polyethylene (about 100° C.). Good results were also obtained in: (a) a reactor constructed entirely of high molecular weight polyethylene (plastic material produced by the conventional high-pressure polymerization of ethylene); (b) a Pyrex (borosilicate) glass reactor whose entire surface had been subjected to trimethyl monochlorosilane overnight at room temperature; (c) a Pyrex glass reactor whose entire surface had been coated with a methyl polysiloxane (Dow-Corning Silicone 220 Fluid) followed by baking of the coating at 170° C. for one hour; and (d) a Pyrex glass reactor whose walls had been wet with water and then treated with dimethyl dichlorosilane to produce a methylpolysiloxane film thereon. However, in many of the above cases, the substantially inert reactor surface was not maintained on continued reaction and, after several hours of operation, the mole ratio of peracetic acid to acetic acid in the products declined, showing that more of the acetaldehyde was converted to acetic acid and other products rather than to the more valuable peracetic acid. The use of a Pyrex glass reactor whose surface had not been treated as described gave low mole ratios of peracetic acid to acetic acid in the products, even when the glass surface had been cleaned with a mixture of nitric and sulfuric acids and even when the glass surface had been subjected to alcoholic potassium hydroxide and then washed with water. Treatment of the glass surface with an aqueous solution of potassium chloride, or with a saturated aqueous solution of boric acid, or with dilute phosphoric acid, followed in each case by drying, caused a drastic decline in the mole ratio of peracetic acid to acetic acid in the products, as compared with the ratio obtained with a clean glass surface. The introduction of a surface of stainless steel (Type 316) into the reactor resulted in a similar drastic decline in this mole ratio, with an accompanying increase in the rate of reaction. Likewise, the introduction of a relatively small Vycor tube into an aluminum reactor caused a marked decrease in the mole ratio of peracetic acid to acetic acid in the products, as well as an increase in the rate of reaction and an increase in the amount of acetaldehyde converted to carbon dioxide. When the reactor walls are of fluorinated polymers, such as polytetrafluoroethylene (Teflon), or of tin or magnesium (e.g. an alloy of magnesium containing 3% aluminum and 1% zinc), very good results are obtained, i.e. high ratios of peracetic acid to acetic acid at high efficiencies.

Excellent results have been obtained with reactor surfaces of commercial aluminum. Preferably the surface of the reactor is treated with nitric acid, before the start of the reaction, to further passivate the surface. It is found that traces of certain impurities affect the inertness of the reactor surface, and it is therefore preferred that the oxygen and acetaldehyde be fed to the reactor through aluminum tubing.

An alternative method of providing substantially inert surface on the reactor walls involves the introduction of a higher boiling liquid, having a boiling point above the reaction temperature and inert under the conditions of reaction, into the reactor so that the walls are kept coated with a film of the liquid. Examples of suitable liquids for this purpose are liquid perfluorinated polyvinyl chloride and the oily polymers of trifluoromonochloroethylene (having about 2 to 16 monomeric units in the polymer molecule) known as "Kel-Flo" polymers, "Halocarbon" oils and "Fluorolubes."

The separation of the peracetic acid and acetic acid from the reaction mixture may be effected in any convenient manner. In one efficient procedure the gaseous stream leaving the reactor is fed directly to the intermediate portion of a distillation column. Vapors of an inert solvent are fed into the bottom portion of this column, and a solution of peracetic acid and acetic acid in the solvent is taken off, as a liquid, from the bottom of the column. Vapors of unreacted acetaldehyde are taken from an intermediate point on the column, above the point of introduction of the reaction mixture. These acetaldehyde vapors may be recycled to the reactor together with further quantities of oxygen. Other gases, such as unreacted oxygen or carbon monoxide or carbon dioxide produced in the reactor, leave the system from the top of the column. The solvent used in the column is preferably one which boils between the boiling points of acetaldehyde and peracetic acid and, most preferably, below 80° C. Acetone, methylal, methanol, and water are suitable solvents. As stated, the peracetic acid solution recovered from the base of the column will also contain acetic acid, but this is not objectionable commercially.

The following examples are given to illustrate the invention further.

Example I

Dry cylinder oxygen, at the rate of 146 ml./min. at 25° C. (6 mg. mole/min.) and freshly distilled acetaldehyde (at the rate of 72 mg. mole/min.) were fed to a reactor maintained at a temperature of 120° C. The reactor, which had a volume of 1000 ml., was constructed of 3 inch internal diameter aluminum pipe (Type 3003 Aluminum containing 0.20% Cu, 0.6% Si, 1–1.5% Mn, 0.7% Fe and 0.10% Zn) 9 inches long, with its ends sealed by flat aluminum plates (of Type 1160 Aluminum containing 0.05% Cu and in which the sum of the Fe and Si contents is a maximum of 0.40%); at the lines of contact of the pipe and plates were annular gaskets of polytetrafluoroethylene (Teflon). The pipe was fitted with an inlet and an outlet, both of ¼ inch external diameter aluminum tubing, the inlet and outlet being so positioned that the gases entered the reactor radially through the pipe wall at a point one inch from one end of the pipe and left the reactor through the wall at a point which was one inch from the other end of the pipe and was 180° from the inlet. A closed well for a thermocouple projected one inch into the reactor; this well was likewise constructed of ¼ inch external diameter aluminum tubing and was situated midway between the ends of the pipe. Prior to starting the reaction, the reactor was soaked in 50% aqueous nitric acid at 5° C. overnight, then rinsed with distilled water, washed with acetone and dried. The residence time of the reacting mixture in the reactor was 0.4 min. The reaction mixture leaving the reactor was fed continuously to a 35 tray Oldenshaw distillation column 1 inch in diameter, at the fifth tray from the top. Acetone was supplied to the column through a reboiler (heated externally with boiling benzene) at its base, and an acetone solution containing 25% peracetic acid, as well as acetic acid, was withdrawn continuously from the base of the column. Unreacted acetaldehyde vapors were taken off just below the top of the column and vent gases (primarily oxygen) were passed out overhead. The mole ratio of peracetic acid to acetic acid produced was about 11.5:1. 51% of the oxygen and 4.4% of the acetaldehyde supplied were reacted, and the efficiency of conversion of acetaldehyde to peracetic and acetic acids was about 96%.

Example II

Freshly distilled acetaldehyde and dry oxygen were fed to a reactor similar to the one used in Example I and having a diameter of 6 inches, a height of 10.31 inches, a volume of 4900 ml. and a surface:volume ratio of 0.335 cm.$^{-1}$. The aluminum used in this reactor was Type 6063 (containing 0.10% Cu, 0.2–0.6% Si, 0.1% Mn, 0.35% Fe, 0.10% Zn, 0.45–0.9% Mg and 0.10% Tl) except for the end plates, which were of Type 1160 Aluminum. The reactor was pretreated by subjecting it to 50% aqueous nitric acid at 25° C. for 2 hours, then washing it with water and drying it. The feed mixture entered the reactor tangentially to promote back-mixing of feed and reaction products in the reactor. The residence time in the reactor was 21 seconds, the reactor temperature was 160° C. and the concentration of oxygen in the feed was 7 mole percent (the balance being acetaldehyde). The reactor product, which was recovered in a condenser cooled to −70° C., contained 12 moles of peracetic acid per mole of acetic acid and efficiency of conversion of acetaldehyde to peracetic acid and acetic acid was 97–98%. The total conversion of acetaldehyde was 7½%.

Example III

Example II was repeated except that the reactor temperature was 170° C.; the proportion of oxygen in the feed was 12.5 mole percent; and the residence time was 19¼ seconds. The mole ratio of peracetic acid to acetic acid in the products was 11.5:1 and the efficiency as calculated in Example II was 97–98%, even though the percent conversion of acetaldehyde increased to 13.6%. 83% of the oxygen supplied was reacted.

Example IV

In order to determine the effect of a quartz surface in the reactor, Example II was repeated (but at reactor temperatures of 127° C. and 149° C.) using the reactor of Example II and also using the same reactor except for the insertion therein, at the longitudinal axis of the reactor, of a quartz tube having an exposed surface in the reactor of 52 cm.$^2$. Specifically, the quartz tube was that of an ultraviolet lamp (Hanovia 83A-1). The results are given in the following table.

| Reactor temperature, ° C. | Quartz tube present or absent | Mole Ratio of Peracetic Acid to Acetic Acid in Products |
| --- | --- | --- |
| 127 | Present | 2.6:1. |
| 127 | Absent | 17:1 to over 20:1. |
| 149 | Present | 2.5:1 to 4.2:1. |
| 149 | Absent | 10:1 to 14:1. |

Example V

Example IV was repeated except that the reaction temperature was raised to 152° C. and the proportion of oxygen in the feed to 10 mole percent. Also, to show the effects of increased inert surface, strips of pure aluminum foil were hung inside the reactor to increase the surface to volume ratio. The results are tabulated below:

| Type of reactor: | Mole ratio of peracetic acid to acetic acid in products |
|---|---|
| Reactor of Example II | 13:1 to above 20:1. |
| Reactor of Example II with Al strips inserted to increase the surface:volume ratio to 1.0 cm.$^{-1}$ | 10:1 to 16:1. |
| Reactor of Example II with quartz tube as in Example IV | 2.5:1. |

As shown in the above examples IV and V, the inertness of a proposed reactor material may be determined by insertion of the material into an inert-surfaced reactor operating under such conditions as to give, in the absence of the added material, a high peracetic to acetic acid ratio in the products. Thus, in a standard test, the reactor of Example II may be operated under such conditions as to give a peracetic acid to acetic acid mole ratio of at least 10:1 in the products. The effect of the introduction of a surface of 1640 cm.$^2$ of the proposed reactor material into the reactor (thus doubling the surface:volume ratio in the reactor) may then be observed, while operating at the same conditions. Under this test, a reduction of the peracetic acid to acetic acid mole ratio to a value which is less than 50% of the ratio obtained in the absence of the added material indicates that the proposed reactor material is not substantially inert. It is prefered to use materials of such inertness that under the foregoing test the peracetic:acetic mole ratio is not reduced to less than 70% of the ratio obtained in the absence of the added material.

The ratio of peracetic of peracetic to acetic acid may be determined by iodometry. A sample containing about 0.1 g. of peracetic acid is added to a mixture of 3 g. KI; 1 g. acetic acid, 3 g. sodium acetate and 30 ml. water at 0° C. The solution is then titrated immediately with 0.1 N aqueous sodium thiosulfate. For each mole of acetic acid, the reaction with KI produces one mole of iodine, which requires 2 moles of sodium thiosulfate for its removal.

To determine the amount of acetic acid, another sample is added to an excess of 0.1 N aqueous NaOH containing several ml. of acetaldehyde and the mixture is allowed to stand for five minutes at room temperature. This converts each mole of paracetic acid to 2 moles of acetic acid by reaction with acetaldehyde. The resulting mixture is then titrated with 0.1 N aqueous sulfuric acid in the presence of phenolphthalein as an indicator, thus giving a determination of the total amount of acetic and peracetic acid originally in the sample.

In all the above examples the reaction was effected at substantially atmospheric pressure. However, higher or lower pressures may be employed, e.g. a pressure of about 2 atmospheres absolute is very suitable.

While the process of this invention is particularly useful in the oxidation of acetaldehyde to produce peracetic acid it may also be employed in the oxidation of homologous aldehydes, such as propionaldehyde, butyraldehyde and valeraldehyde to produce the corresponding peracide, e.g. perpropionic, perbutyric and pervaleric acids.

The reactor may be made of any combination of different materials, selected from those described as suitable above. For example, part of the reactor may be of aluminum and another part of the same reactor may be of polytetrafluoroethylene or tin or magnesium.

It is to be understood that the foregoing detailed description is given merely by way of illustration and that many variations may be made therein without departing from the spirit of our invention.

Having described our invention, what we desire to secure by Letters Patent is:

1. In the process for the production of peracetic acid by the vapor phase reaction of oxygen and acetaldehyde, the improvement which comprises effecting said reaction in a reactor having internal surfaces consisting essentially of an inert material whose inertness is defined by the failure of said material to reduce the ratio of peracetic acid to acetic acid by more than 50% when tested by the insertion of a strip of said material into an aluminum reactor maintained under acetaldehyde-oxygen vapor phase reaction conditions which would, in the absence of said strip, produce a peracetic acid to acetic acid mole ratio in excess of 10, said strip of material being tested having a surface area equal to that of the interior of said aluminum test reactor.

2. Process as claimed in claim 1 in which the residence time in the reactor during the process of said claim is at least about 5 seconds, the reaction is effected at about 80–200° C., and said process is effected continuously.

3. Process as claimed in claim 2 wherein said reactor has a surface to volume ratio below about 1 cm.$^{-1}$ and wherein the ratio of peracetic acid to acetic acid produced in said reactor is at least about 5:1.

4. Process as claimed in claim 3 wherein said reactor temperature is 80–170° C.; and wherein the freshly fed oxygen and acetaldehyde are continuously mixed with the products of the acetaldehyde-oxygen vapor phase reaction in said reaction zone.

5. In the process for the production of peracetic acid by the vapor phase reaction of oxygen and acetaldehyde at about 80 to 200° C., the improvement which comprises effecting said reaction in a reactor whose internal surfaces are of at least one material selected from the group consisting of fluorinated polymers, magnesium, tin and aluminum.

6. The process of claim 5 wherein said internal surface material is polytetrafluoroethylene.

7. The process of claim 5 wherein said internal surface material is magnesium.

8. The process of claim 5 wherein said internal surface material is tin.

9. The process of claim 5 wherein said internal surface material is aluminum.

References Cited by the Examiner

UNITED STATES PATENTS

| 1,179,421 | 4/16 | Galitzenstein et al. | 260—502 |
| 2,314,385 | 3/43 | Bludworth | 260—502 |
| 2,450,389 | 9/48 | Tuerck | 260—530 |
| 2,804,473 | 8/57 | Phillips et al. | 260—502 |
| 2,830,080 | 4/58 | Stevens | 260—502 |
| 2,833,813 | 5/58 | Wallace | 260—502 |
| 2,833,814 | 5/58 | Golding | 260—502 |
| 2,894,970 | 7/59 | McKinley et al. | 260—687 |
| 3,061,646 | 10/62 | Bartok et al. | 260—604 |

FOREIGN PATENTS

| 54,515 | 5/11 | Austria. |
| 67,949 | 2/15 | Austria. |
| 396,161 | 1/09 | France. |
| 41,262 | 2/08 | Switzerland. |

OTHER REFERENCES

Becco Bulletin #4, Peracetic Acid 40%, 1952 Edition, pages 1–4, 7.

Fetter: Chemical Engineering, November 1949, pages 120–124.

Uhlig: Corrosion Handbook, 1948, pages 617, 632, 633.

LORRAINE A. WEINBERGER, *Primary Examiner.*

CHARLES B. PARKER, LEON ZITVER, *Examiners.*

Disclaimer 3,192,256.—*Alexander F. MacLean* and *Adin L. Stautzenberger*, Corpus Christi, Tex. PROCESS FOR MAKING PERACIDS BY THE OXIDATION OF ALDEHYDES. Patent dated June 29, 1965. Disclaimer filed Jan. 31, 1969, by the assignee, *Celanese Corporation*.

Hereby enters this disclaimer to claims 1 to 5, inclusive, and 9 of said patent.

[*Official Gazette April 29, 1969.*]